(12) United States Patent
Arai et al.

(10) Patent No.: US 7,793,291 B2
(45) Date of Patent: Sep. 7, 2010

(54) THERMAL MANAGEMENT OF A MULTI-PROCESSOR COMPUTER SYSTEM

(75) Inventors: Susumi Arai, Kenmore, WA (US); Ryuji Orita, Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 1658 days.

(21) Appl. No.: 11/020,409

(22) Filed: Dec. 22, 2004

(65) Prior Publication Data

US 2006/0136074 A1  Jun. 22, 2006

(51) Int. Cl.
- G06F 9/46 (2006.01)
- G06F 9/00 (2006.01)
- G06F 11/00 (2006.01)
- G06F 1/00 (2006.01)

(52) U.S. Cl. ............... 718/100; 718/105; 718/108; 712/228; 712/229; 713/100; 713/300; 713/320; 713/322; 714/47

(58) Field of Classification Search ......... 718/1, 718/100, 101, 102, 103, 104, 105, 108; 713/1, 713/100, 301, 320, 321, 322, 300, 323, 330; 714/47; 712/203, 228, 229, 43
See application file for complete search history.

(56) References Cited

U.S. PATENT DOCUMENTS

| | | | | |
|---|---|---|---|---|
| 4,972,314 A | * | 11/1990 | Getzinger et al. | 711/149 |
| 5,361,362 A | * | 11/1994 | Benkeser et al. | 718/102 |
| 5,404,515 A | * | 4/1995 | Chasse et al. | 718/106 |
| 5,459,864 A | * | 10/1995 | Brent et al. | 718/105 |
| 5,461,266 A | * | 10/1995 | Koreeda et al. | 307/125 |
| 5,502,838 A | | 3/1996 | Kikinis | 395/550 |
| 5,805,403 A | * | 9/1998 | Chemla | 361/103 |
| 5,838,578 A | * | 11/1998 | Pippin | 716/4 |
| 5,913,068 A | * | 6/1999 | Matoba | 713/322 |
| 5,915,232 A | * | 6/1999 | McMinn | 702/130 |
| 6,091,255 A | * | 7/2000 | Godfrey | 324/760 |
| 6,098,030 A | * | 8/2000 | McMinn | 702/132 |
| 6,233,190 B1 | * | 5/2001 | Cooper et al. | 365/212 |
| 6,394,572 B1 | * | 5/2002 | Pierce et al. | 347/17 |
| 6,472,848 B2 | * | 10/2002 | Stryker et al. | 320/135 |
| 6,512,209 B1 | * | 1/2003 | Yano | 219/497 |
| 6,718,474 B1 | * | 4/2004 | Somers et al. | 713/322 |
| 6,779,122 B2 | * | 8/2004 | George et al. | 713/330 |
| 6,792,550 B2 | * | 9/2004 | Osecky et al. | 713/300 |
| 6,987,399 B2 | * | 1/2006 | Lee | 324/760 |
| 7,017,059 B2 | * | 3/2006 | Law et al. | 713/322 |
| 7,032,119 B2 | * | 4/2006 | Fung | 713/320 |
| 7,069,189 B2 | * | 6/2006 | Rotem | 702/189 |
| 7,149,907 B2 | * | 12/2006 | McAfee et al. | 713/300 |
| 7,228,441 B2 | * | 6/2007 | Fung | 713/300 |

(Continued)

FOREIGN PATENT DOCUMENTS

JP  09305268  * 11/1997

*Primary Examiner*—Meng-Ai An
*Assistant Examiner*—Abdullah Al Kawsar
(74) *Attorney, Agent, or Firm*—Jason O. Piché

(57) ABSTRACT

A method and apparatus are provided for thermal management of a multiprocessor computer system. The temperatures of the various processors within a multiprocessor system are monitored. When a processor is identified as overheated, a dummy process will be assigned to it, causing all other processes to be put on hold, thereby reducing the heat output of that processor. When the temperature of the processor lowers below another predetermined value, then the dummy process is terminated.

24 Claims, 7 Drawing Sheets

U.S. PATENT DOCUMENTS

| | | | |
|---|---|---|---|
| 7,254,750 B1 * | 8/2007 | Okun et al. | 714/47 |
| 7,302,687 B2 * | 11/2007 | Austin | 718/105 |
| 7,475,269 B2 * | 1/2009 | Padwekar et al. | 713/400 |
| 7,587,262 B1 * | 9/2009 | Pippin | 700/299 |
| 2001/0003207 A1 * | 6/2001 | Kling et al. | 713/320 |
| 2002/0065049 A1 | 5/2002 | Chauvel et al. | 455/66 |
| 2002/0087903 A1 * | 7/2002 | Hermerding et al. | 713/320 |
| 2003/0048317 A1 * | 3/2003 | Usui et al. | 347/14 |
| 2003/0110423 A1 | 6/2003 | Helms et al. | 714/100 |
| 2003/0149598 A1 * | 8/2003 | Santoso et al. | 705/2 |
| 2003/0229662 A1 | 12/2003 | Luick | 709/106 |
| 2004/0064745 A1 * | 4/2004 | Kadambi | 713/322 |
| 2004/0139256 A1 | 7/2004 | Lee | 710/104 |
| 2005/0140385 A1 * | 6/2005 | Lee | 324/760 |
| 2005/0193278 A1 * | 9/2005 | Hammarlund et al. | 714/47 |
| 2005/0278520 A1 * | 12/2005 | Hirai et al. | 713/1 |
| 2006/0031721 A1 * | 2/2006 | Blanchard et al. | 714/47 |
| 2006/0251115 A1 * | 11/2006 | Haque et al. | 370/466 |

* cited by examiner

THERMAL MANAGEMENT OF A MULTI-PROCESSOR COMPUTER SYSTEM

FIELD OF THE INVENTION

The present invention relates to computers and computer systems including more than one processor. Processors running computational processes generate heat as an inevitable by-product. The more processors present in a multiprocessor system, the more heat they will generate. The amount of heat each processor generates will increase with the processing speed of the processor. As processors become able to function at faster and faster speeds, they will generate increasing amounts of heat. That heat must be dissipated. If the heat is generated at a faster rate than it can be dissipated, then the temperature of the processor will rise. Excess heat can cause processors to degrade performance or even fail. The heat generation problem is exacerbated in multi-processor systems as each processor is generating heat into the overall enclosure. At the same time, the demand for high-density servers, such as blade servers, is increasing. Performance requirements based on user demand are increasing. Thus, multiprocessor systems have increasingly more processors running at higher processing speed, both factors of which cause increased heat production. Unless that heat production is controlled, overall system performance can degrade. Heat production can be managed in many ways. Task allocation between processors is one of those ways. Thus, the field of this invention is thermal management of a multiprocessor computer system through task allocation.

BACKGROUND

Modern computer systems may be composed of a number of processors. These processors may be configured with multiple processors on one integrated circuit. Alternately, they may be configured on multiple networked computers. Tasks may be allocated between processors by an operating system or a separate computer program. Each processor generates heat. That heat generation is increased as more processes run, and as those processes run at faster speeds. Excess heat can degrade the performance of an individual processor, or even cause failure of that device. If the temperature distribution of the various processors is uneven, and some of them exceed the threshold while others are far below the threshold, the speed of those overheated processors is throttled and the performance of the entire system goes down. Other processors that are not overheated may be underutilized and the overall system performance may degrade. On the other hand, if the temperature of all CPU is kept below the threshold, all CPU's can keep running at full speed. Therefore, it is advantageous to manage the heat in a multi-processor computer system.

Some modern processors are designed with electronic sensors resident in the same integrated circuit chip as the central processing unit ("CPU") of the processor for measuring the temperature at or near the CPU. Alternately, a circuit board may contain a temperature sensor located physically near the processor if one is not resident in the same chip. Controlling mechanisms, either in operating system software or elsewhere may utilize this temperature data or act on the computer system or individual processors to minimize overheating of either individual processors or the overall system. In some modern processors, the temperature sensor may be passive, as in the case of a resistor, whose electrical resistivity varies with temperature. Alternately, the processor chip may include an active sensor, which can send a signal when the chip temperature exceeds a predetermined value.

While generation of heat is due to processor activity, dissipation of that heat may be influenced by many factors. For example, the physical mounting of a processor may affect the rate at which heat is dissipated. Similarly, airflow around the processor may affect the heat dissipation rate. Greater airflow can result in faster heat dissipation, while the reverse may be true also. One approach to thermal management involves managing tasks assigned to processors.

DESCRIPTION OF THE RELATED ART

There are several solutions to thermal management commonly used in multi-processor system designs.

One approach is to design the mountings of the individual processors with large heat sinks with sufficient thermal properties to dissipate the maximum amount of heat each processor might generate. However, this solution has numerous drawbacks, including the large physical size required for adequate heat sinks or else large and noisy fans for faster heat dissipation. In addition, this approach runs counter to the industry trend of increasingly dense computer systems. Such dense computer systems, such as blade servers, would physically be unable to include the hardware components for such intense heat dissipation.

Other approaches involve measurement of the actual temperature of the processor and taking actions which results in the processor cooling down. One approach is disclosed in U.S. Pat. No. 5,502,838 and commonly referred to as thermal throttling. With this approach, the speed of a processor is reduced when its temperature exceeds a predetermined threshold, but there is no halting or movement of processes. While this approach works well for an individual processor, such thermal throttling may unnecessarily hamper the overall system performance. The overheating may be caused by a local condition, such as poor air flow, that affects only one overheated processor. That particular processor would be caused to run at a slower rate, resulting in the processes on it taking longer to complete. Those same local conditions which contributed to the overheating might also slow the cooling. At the same time, there may be other processors at well below the critical temperature that could run the particular process at full speed. Thus the overall system performance is unnecessarily degraded.

Another solution, as disclosed in a published patent application US 2003/0229662 A1 involves a component of an operating system monitoring the temperature of all processors in a system. Whenever the temperature of a particular processor exceeds a predetermined value, that process is stopped and moved to another processor. This solution to the problem of optimizing overall system performance in the context of heat management has the drawback that processes may be constantly disrupted. Furthermore, as a processor may cool down quite quickly after the process causing its overheating has been removed, always stopping the processes running on it, moving them to another processor, and then re-starting the interrupted processes may take more time than simply halting processes and waiting for the processor to cool down. Finally, in a computer system in which all processors are not of the same capability, moving a process to another processor may results in that process being run on a slower or faster than desired processor, which could adversely affect overall system performance.

Another solution, as disclosed in U.S. Pat. No. 5,913,068, electrically removes processor(s) from the system to reduce the power consumption. The drawback to this approach is that the context of the processor is lost. When the context is lost, the states of any processes running on that processor may be lost also. Bringing those processes back into operation may require an undue amount of time, thereby degrading the overall system performance.

SUMMARY OF THE INVENTION

The invention relates to thermal management of a multi-processor computer system. A method of the invention includes monitoring the temperatures of the processors within a multi-processor computer system. The method determines which, if any, of the temperatures of the various processors in the computer system are above a predetermined threshold value and are hence over-heated. When such processors are detected, a dummy process is inserted in that processor. That dummy process has a higher priority than all other processes running on that processor, and causes them to be stopped and moved to a holding queue. In one embodiment of the invention the dummy process may cause the processor to stop completely. In another embodiment the dummy process may run at a very slow speed, thereby permitting it to cool down. However, this embodiment differs from the known method of thermal throttling in that the insertion of the dummy process halts the process which caused the overheating.

This invention acts by monitoring the temperature of each central processing unit ("CPU") or "processor" in the computer system and acting to avoid overheating of individual processors and an uneven distribution of the temperatures between processors. That temperature monitoring is accomplished by utilizing temperature-sensing circuitry that is located in or adjacent to the chip containing the CPU, processor or processors.

The temperature monitoring is performed by module, referred to as a thermal monitor, which may be implemented in hardware, software, or a combination of the two. In one embodiment of the invention, the thermal monitor regularly polls each processor and inquires the temperature of that processor. In another embodiment, the thermal monitor responds to interrupts generated by the temperature sensor of any overheated processor in the system. The thermal monitor may be incorporated within the computer system operating system or it may be a stand-alone module operating interactively with that operating system. In one embodiment, the thermal monitor is software running on a processor that is not subject to thermal management.

When the thermal monitor detects an overheated processor, it starts a dummy process on that processor. The dummy process is assigned the highest priority the operating system will allow except for the priorities assigned to the processes of the thermal management itself, of the processes associated with process scheduling. That highest priority is reserved by the operating system for dummy processes, so that no running process can have a higher priority than a dummy process. An illustrative example of a dummy process is the HALT command implemented in certain processors manufactured by the Intel Corporation. That command causes the processor to cease operation until another interrupt signal is sent to the processor to cease the HALT command.

When a process is interrupted by a higher priority dummy process, its current state is saved, and it is moved into a process queue associated with that particular processor. As the processor cycling is stopped or slowed when the dummy process is in place, the processor's heat generation also slows down. The processor, then, will begin to cool. The thermal monitor will continue monitoring all overheated processors to identify when each one has cooled down to be within an acceptable temperature range. In one embodiment of the thermal monitor, the thermal monitor regularly polls all processors, including overheated ones upon which dummy processes are being run. In another interrupt-driven alternative embodiment, a processor will signal its temperature and the thermal monitor will note when that temperature drops into an acceptable range.

When the temperature of an overheated processor does drop into an acceptable range, the thermal monitor will issue an interrupt command that will cause the dummy process on that previously overheated processor to terminate. Then, after the dummy process terminates, other processes within the process queue of that processor will re-start according to their own priorities.

The computer system operating system may also include a process scheduler. The function of the process scheduler is to allocate processes between the various processors. Once a process has been allocated to a particular processor, it is advantageous from a performance standpoint for that process to stay with that processor. However, when a process is ready to run and has been idle in a particular processor for longer than a pre-defined time, it may then be advantageous to move the process to another processor, in spite of the system inefficiency incurred. The predetermined time a process scheduler may wait before transferring an idle process to another processor may be determined to optimize system performance by balancing the computation time lost by moving the process against the expected time for a processor to cool down to an acceptable temperature. Any process that has been idle for a time longer than the average time for cool-down might be moved to another processor. Likewise, overall system performance may be improved by allowing a process to stay idle for an amount of time that is less than the average time for a processor to cool down.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
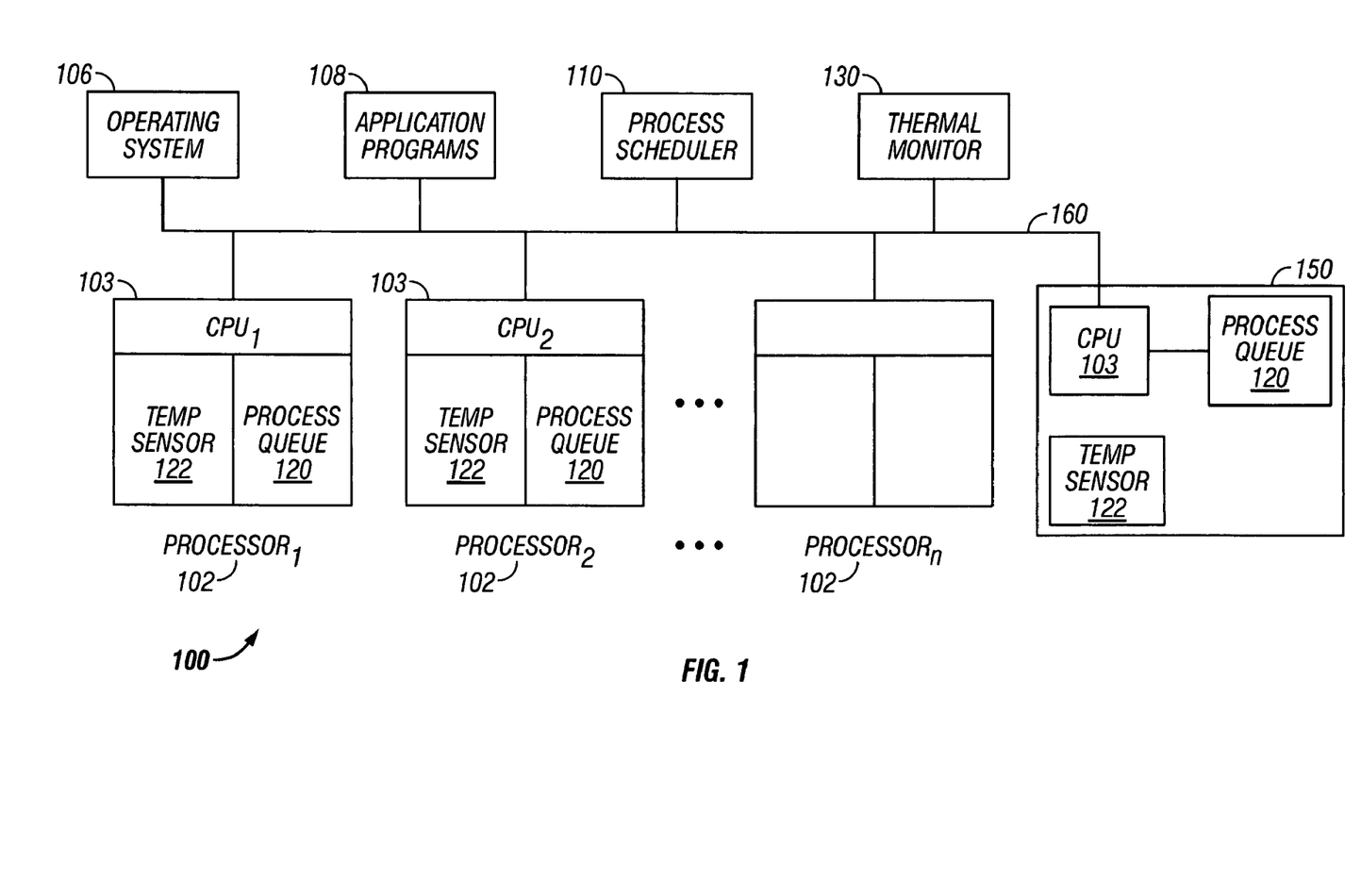
FIG. 1 is a diagram of a rudimentary multi-processor computer system, according to an embodiment of the invention.

FIG. 1 shows a rudimentary multiprocessor computer system 100, according to an embodiment of the invention. The computer system 100 is depicted in FIG. 1 as including one or more processors 102. In alternative embodiments, some or all of the elements of the processor 102 are in an integrated circuit chip. In other alternative embodiments, some or all of the elements may be in different chips mounted on the same or connected circuit boards 150. In other alternative embodiments, some or all of the components may be integrated into a single chip. Each processor 102 or 150 includes a central processing unit ("CPU") 103, a temperature sensor 122 that may be embedded in an integrated circuit chip alone with the CPU 103 or in an alternative embodiment located on a circuit board 150 close to the CPU 103, and a process queue 120. As can be appreciated by those of ordinary skill within the art, the computer system 100 may include other software and/or hardware components, in addition to and/or in lieu of those depicted in FIG. 1. The components of the multiprocessor computer system 100 may be connected by a bus 160 or by other structures for providing electrical interconnectivity.

In one embodiment of the invention, all processors in the system are subject to the thermal management by the invention. In another embodiment of the invention, at least one processor is not subject to thermal management.

The processors 102 or 150 are the hardware that executes the operating system 106, and the application programs 108. The operating system 106 is the master control program that runs the computer system 100. It is typically the first program loaded when the computer system is turned on. The operating system 106 sets the standards for all application programs, such as the application programs 108 that run on the computer system 100. The application programs 108 are programs that have specific functionality, and that communicate with the operating system 106 for user interface, file management, and other operations. The application programs 108 further act to spawn processes. Those processes may be allocated between different processors by the process scheduler 110.

The process scheduler 110 prioritizes and allocates newly spawned processes to different processors. A process scheduler is the component of a multiprocessor computer system that selects the order and priority by which processes will be run. It can be viewed as the code that divides the finite resource of processor time between the runnable processes on a system. The scheduler is the basis of modern multitasking operating systems such as Linux and Windows and is well known by one skilled in the art. By deciding the order and priority in which processes may run, the scheduler is responsible for best utilizing the system and giving the impression that multiple processes are simultaneously executing.

The functionality provided by the process scheduler is well known by one skilled in the art. To best utilize processor time, assuming there are runnable processes, a process should always be running. If there are more processes than processors in a system, some processes will not always be running. These processes are waiting to run. Deciding what process runs next, given a set of runnable processes, is a fundamental decision the scheduler must make.

Process schedulers may come in multiple embodiments. In one embodiment of the invention, the process scheduler provides preemptive multitasking. In preemptive multitasking, the scheduler or other element of the system issues a signal that causes a process to stop running and another process is to start if new or resume running if old. In another alternative embodiment, each process is assigned a length of time it may run.

An embodiment of the process scheduler aspect of the invention includes priority-based scheduling. Priority based scheduling in a process scheduler assigns priorities to processes and ranks those processes based on their worth and need for processor time. Processes with a higher priority will run before those with a lower priority, while processes with the same priority are scheduled round robin (one after the next, repeating). When a processor receives a process with a higher priority than the one currently running, it will stop that currently running process and move it to a process-holding queue 120 where the process will be held until the higher priority process completes.

In an embodiment of the invention, the process scheduler also monitors the process holding queue 120 in each processor. When it determines that a process has been in the process holding queue of a given processor for longer than a predetermined length of time, it then moves that process to another processor. In one embodiment of the invention, the process scheduler also performs the additional step of determining the temperature of the processor 102 or 150 through querying the temperature sensor 122 of the processor before it assigns a process to that processor. When there are no available processors to transfer a process to, it does nothing.

In one embodiment of the invention, processes involved the running of the process scheduler are run on a processor or processors that are not subject to thermal management.

In various embodiments of the present invention, the temperature sensor 122 may be in the same semiconductor chip as the CPU 103, in the separate regions on the microprocessor integrated circuit where different functional units reside. In other embodiments of the invention the temperature sensor 122 may be in close physical proximity to the CPU 103 on a circuit board 150. In one embodiment of the invention, the temperature sensor 122 is a passive device that can be read by an active listening device to determine the temperature at or near the CPU 103. In another embodiment of the invention, the temperature sensor 122 may be an active device which will generate a signal when the temperature at or near the CPU 103 exceeds a predetermined value. In another embodiment of the invention, the temperature sensor 122 may generate a signal both when the temperature at or near the CPU 103 exceeds a predetermined value and another signal when the temperature lowers to below another predetermined value.

There are a number of ways temperature may be indirectly sensed by solid state circuits designed into microprocessor functional regions. For example, circuitry may be incorporated in a functional unit area to respond to test signals according to the temperature of circuit elements. Temperature affects physical and electrical characteristics of materials. As a simple example, because resistance of materials changes in known ways according to temperature fluctuations, a circuit might be included in a functional region with one or more resistor elements, and current and/or voltage changes in response to a known input may be measured as an indication of temperature change. Another way an indication of temperature may be obtained is by including a circuit in each functional area wherein the rate of signal propagation may be measured as an indication of temperature. Yet another way is to incorporate an oscillator circuit arranged in a manner to exhibit a frequency varying with temperature. Various forms of circuitry for indirect measurement of temperature are known in the art, and it will be apparent to those with skill in the art that temperature may be monitored for a semiconductor circuit indirectly in a number of different ways, and the measurements related empirically to temperature.

In other embodiments of the invention, the temperature sensor 122 may incorporate logic elements that will send an interrupt signal based on or related to the temperature at or near the CPU. In other embodiments, the sending of the interrupt signal may be based on the temperature differential between the CPU and another temperature sensing device located in another area of the computer system known to be not susceptible to overheating.

The thermal monitor 130 receives temperature information from temperature sensor 122. In embodiments of the invention in which the temperature sensor 122 is an active device, the thermal monitor 130 will receive an interrupt signal from the temperature sensor 122 when the temperature at or near the CPU 103 exceeds a predetermined value. In this embodiment, when the thermal monitor 130 receives such a signal it will determine which processor 102 caused the interrupt to be generated and will then spawn a dummy process to that processor 102.

A dummy process is a process that requires very little or no workload on the CPU 103 and/or puts the CPU 103 in a low power consumption mode hence generates very little heat in comparison to other more computation intensive processes, or no heat at al. An illustrative example of a dummy process is the HALT command common to CPUs produced by the Intel Corporation. This command may stop or slow the operation of a portion of the CPU, and lower the voltage & frequency of the CPU to minimize its power consumption. In one embodiment of the invention, the dummy process has a higher priority than all other processes which the operating system 106 will allow in the computer system 100 and therefore pre-empts any currently running process.

In an embodiment of the invention, the dummy process will run until it is terminated by an external command. In another embodiment of the invention, the thermal monitor may also assign a running time to the dummy process. The dummy process will run for the length of time it is assigned, and then cease running. In different embodiments of the invention, the running time assigned to the dummy process may be predetermined, or it may be determined by the thermal monitor based on system conditions, including the temperature of the processor, system workload levels, or other determinants.

In other embodiments of the invention, the thermal monitor 130 may regularly poll the temperature sensors 122 of each processor 102 or 150. When it identifies any temperature greater than a predetermined threshold value, it will then spawn a dummy process to run on that processor. Similarly, when it determines that the temperature has dropped to below another predetermined value; it will cause the dummy process running on that processor 102 or 150 to terminate.

Once a CPU has overheated, it is advantageous to have it not operate a task that can cause overheating again until the CPU has cooled down below a threshold temperature. The duration of time for adequate cooling depends on the technology of the CPU and the cooling environment. Continued prolonged overheating can cause premature wear out and CPU failure. On phenomenon commonly know in the art, electro migration is accelerated by temperature. Thus in alternative embodiments of the invention, the dummy process will not be terminated until the temperature of the CPU is well below a predetermined value that triggers the insertion of the dummy process.

The process queue 120 is a memory that holds all processes that have been assigned to the processor 102 or 150 but that are not currently running due to having a priority lower than the process running on the processor. Only the process with the highest priority will run at a given point in time. Once the process currently running on the processor is finished or lowers its priority (to wait for external events, such as the completion of I/O request), the process scheduler determines which process to run from the process queue.

Figure 2:
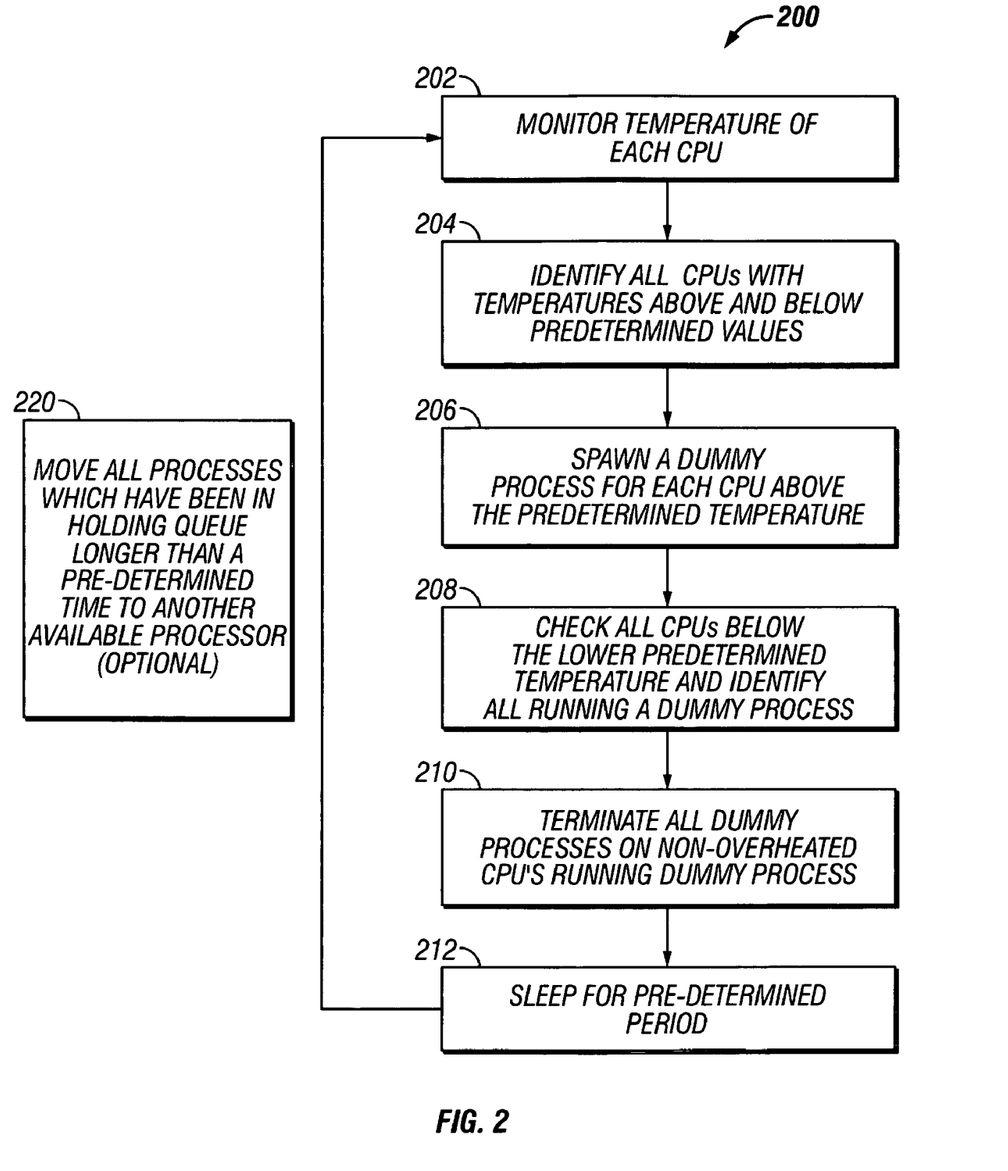
FIG. 2 is a flowchart according to one or more embodiments of the thermal monitoring aspect of the invention.

FIG. 2 shows a method 200 for thermal monitoring. The method 200 may be performed by the operating system 106 of the computer system 100 in one embodiment of the invention, or by another computer program or application program 108 or a combination thereof. The method 200 starts with the step 202 of monitoring the temperature of each processor 120 or 150. The next step 204 is to identify any processor for which the temperature is greater than a predetermined value or less than a second predetermined value. For all processors identified in step 204 having a temperature greater than the predetermined value, the thermal monitor 130 will perform the next step 206 of spawning a dummy process to that overheated processor.

Next the thermal monitor 130 will perform the step 208 of checking each non-overheated processor and identifying any non-overheated processor that is running a dummy process. The next step 210 is to terminate all dummy processes running on all processors that are not overheated. In one embodiment of the invention, the termination of dummy processes may be accomplished by sending a signal to the processor running those processes terminating the dummy process. In another embodiment of the invention in which the dummy processes are of a predetermined time duration, the termination may be performed by allowing the process to lapse. If the processor has cooled sufficiently, a dummy process would not be re-spawned. Then the method will perform the step 212 consisting of sleeping, or waiting for a predetermined time before returning to step 202 checking the temperature of each processor.

Figure 3:
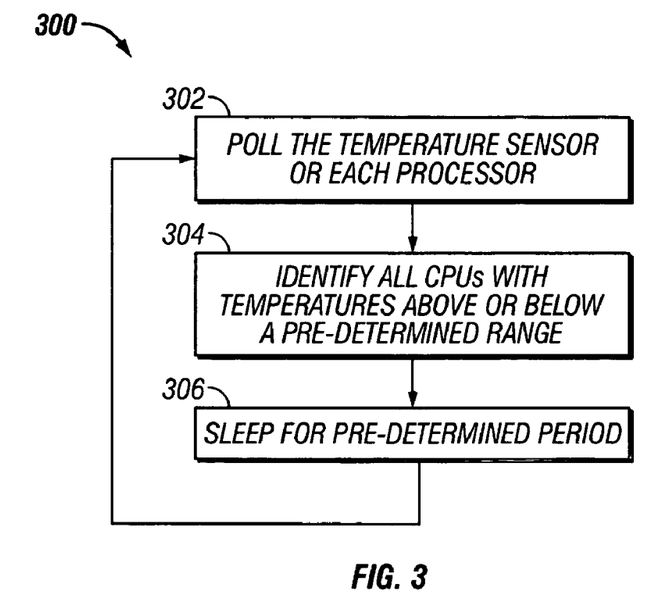
FIG. 3 is a flowchart according to one or more embodiments of the thermal monitoring aspect of the invention.

In an embodiment of the invention the method will perform at regular intervals the optional step 220 of determining if the system has processors not running dummy processes, and if there are such processors, moving all processes that have been in a holding queue longer than a predetermined time to another available processor FIG. 3 shows a method 300 for monitoring the temperature of the processors 102 or 150 of the system according to an embodiment of the invention. In this step the method performs the step of polling the temperature sensor 122 of each processor in the system. Then it performs the step 304 of identifying all processors showing temperatures above a predetermined value, and those below a second predetermined value. Then it performs the step 306 of sleeping for a predetermined time and then repeating step 302.

Figure 4:
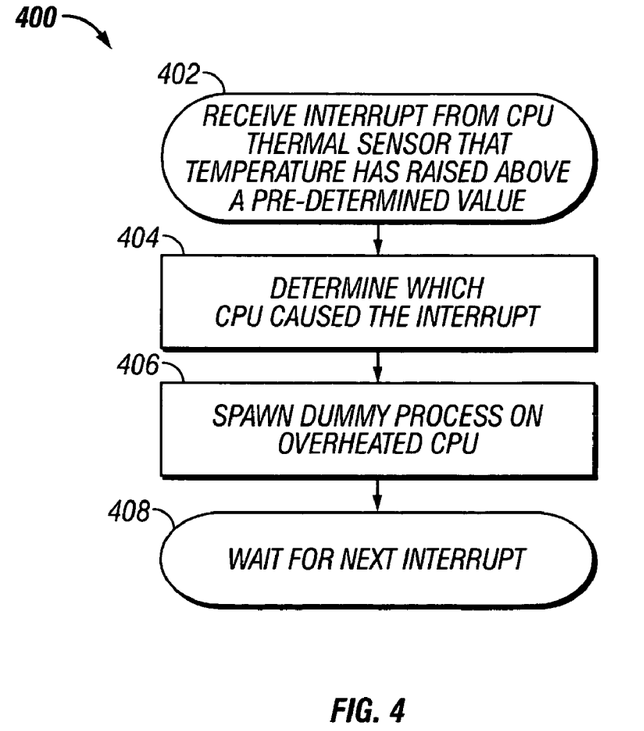
FIG. 4 is a flowchart according to one or more embodiment of the thermal monitoring aspect of the invention.

FIG. 4 shows a method 400 according to one embodiment of the invention for thermal monitoring of a processor 102 or 150 that has overheated. The method 400 may be performed by a component within the operating system 106 of the computer system 100 in one embodiment, or by an application program 108 outside of the operating system or a combination of the two. The first step 402 of the method 400 is to receive an interrupt signal from a temperature sensor 122. In this particular embodiment the temperature sensor 122 would be an active device that generates a signal when the temperature of the processor associated with it reaches a predetermined threshold value. Next the method 400 will perform the step 404 of determining which processor was overheated and causing the interrupt to be generated. Next the method 400 will perform the step 406 of spawning a dummy process to run on the overheated processor. In one embodiment the step 406 will also assign a time for which the dummy process will run. That time may be a fixed predetermined value, or a variable duration determined as part of the step 406. If the time is variable, in one embodiment of the invention it may be related to the absolute or relative temperature of the processor, or other system conditions such as overall system workload. Finally the process 400 will perform the step 408 of waiting for the next interrupt.

Figure 5:
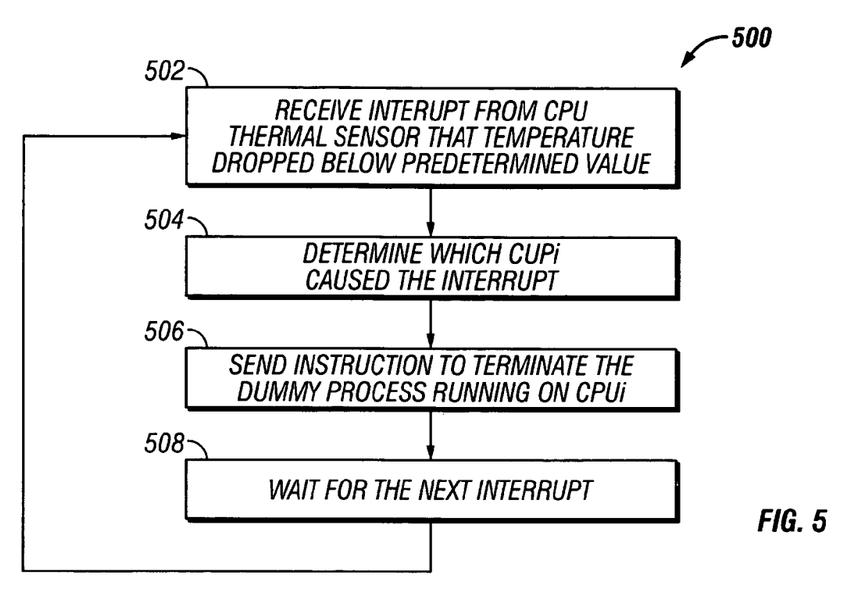
FIG. 5 is a flowchart according to one or more embodiment of the thermal monitoring aspect of the invention.

FIG. 5 shows a method 500 according to an embodiment of the invention for thermal monitoring of a previously overheated processor 102 or 150. The method 500 may be performed by the operating system 106 of the computer system 100 in one embodiment, or by another application program 108, or a combination of the two. The first step 502 of the method 500 is to receive an interrupt signal from a temperature sensor 122. In this particular embodiment the temperature sensor 122 would be an active device that generates a signal when the temperature of the processor associated with it drops below predetermined threshold value. That threshold value may be lower or the same as the predetermined temperature value described in FIG. 4. Next the method 500 will perform the step 504 of determining which processor has cooled below the predetermined temperature and caused the interrupt to be generated. Next the method 500 will perform the step 506 of stopping the dummy process that is running on the previously overheated processor. In one embodiment, the step 506 will terminate the dummy process by sending a signal to the processor causing the dummy process to terminate. Finally the process 500 will perform the step 508 of waiting for the next interrupt.

Figure 6:
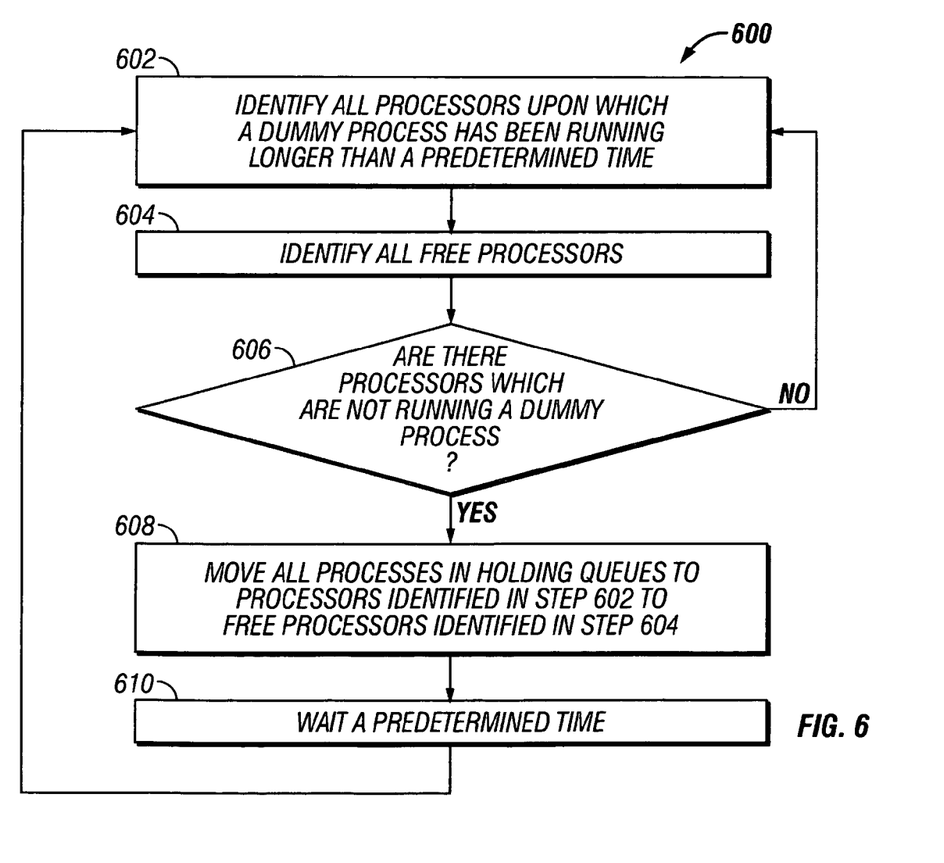
FIG. 6 is a flowchart according to one or more embodiments of the process scheduling aspect of the invention.

FIG. 6 shows a method 600 for scheduling processes according to an embodiment of the invention. The method 600 may be performed by the operating system 106 of the computer system 100 in one embodiment, or by another application program 108, or a combination of the two. The method 600 operates repetitively while the computer system is operating, thus any particular step of the process 600 can be viewed as the starting point. For conceptual purposes it is useful to view process 600 as starting with step 602, identifying all processors upon which a dummy process has been running longer than a pre-determined time. The next step 604 is to identify all free processors, which are processors not running dummy processes and which are not dedicated to running processes of the thermal monitor or process scheduler if in that particular embodiment there are such processors. Next the method queries 606 whether there are any such free processors. If there are not, the method returns to step 602. If there are such processors, then the method moves to step 606, moving all process in holding queues of all processors identified in step 602 to free processors identified in step 604. Then the method waits 608 a predetermined period of time and repeats step 602.

Figure 7:
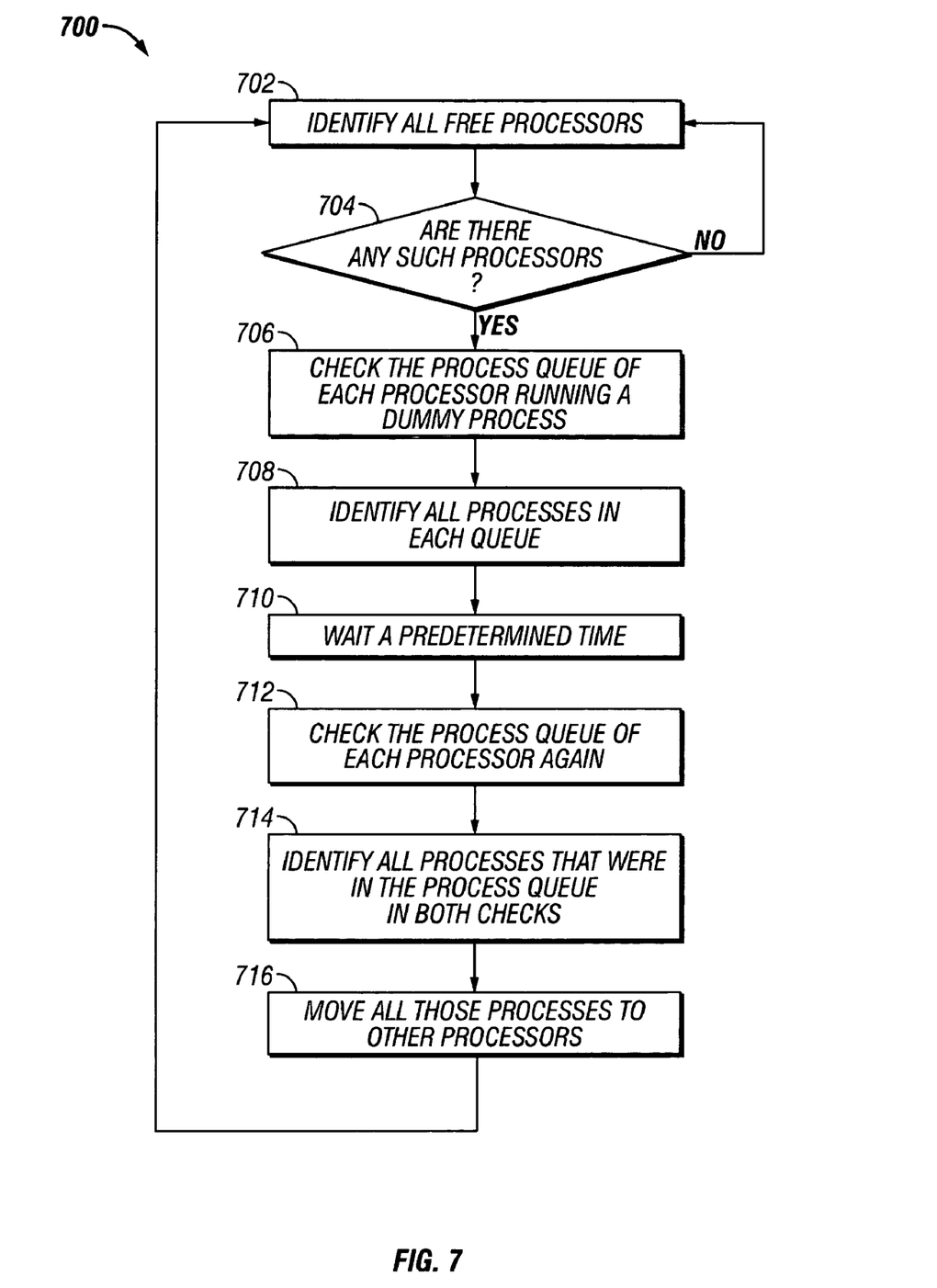
FIG. 7 is a flowchart according to one or more embodiments of the process scheduling aspect of the invention.

FIG. 7 shows a method 700 for scheduling processes according to an embodiment of the invention. The method 700 may be performed by the operating system 106 of the computer system 100 in one embodiment, or by another application program 108, or a combination of the two. The method 700 operates repetitively while the computer system is operating, thus any particular step of the process 700 can be viewed as the starting point. For conceptual purposes it is useful to view process 700 as starting with step 702, identifying all free processors, which are processors 102 or 150 not running a dummy process and not dedicated to running processes of the thermal monitor or process scheduler, if in that particular embodiment there are such processors. The next step 704 is to query whether there are any such free processors. If there are not, then the method returns to step 702 until such free processors are identified.

If any such free processors are identified, then the method performs step 706, checking the process queue 120 of each of the multiplicity of processors 102. Next the method 700 performs the step 706 of identifying all processes in each process queue 120 of processors running a dummy process. Next the method 700 performs the step of waiting a predetermined time and checking the process queue 102 of each process queue of each processor running a dummy process again. Next the method 700 performs the step 714 of identifying all processes that were in a particular process queue in both step 708 and step 714. Next the method 700 performs the step 716 of moving all the processes so identified to other free processors. Next the method 700 returns to step 702 for the next iteration of the method 700.

Figure 8:
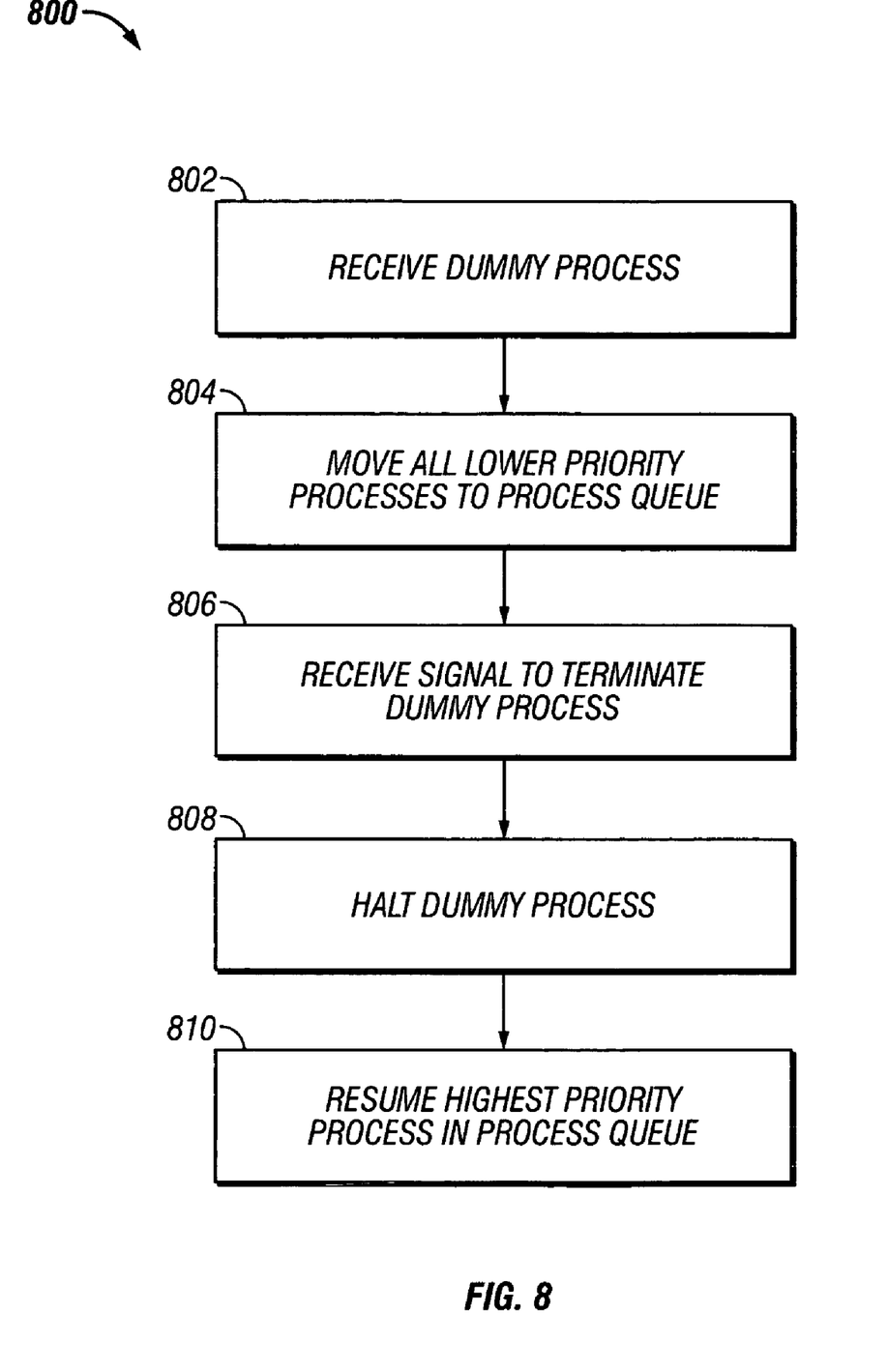
FIG. 8 is a flowchart showing an embodiment of the process holding aspect of the invention.

FIG. 8 shows a method 800 according to an embodiment of the invention. The method 800 may be performed by the operating system 106 of the computer system 100 in one embodiment, or by another application program 108, or a combination of the two in conjunction with a processor 102 or 150. The method 800 commences with step 802 receiving of a dummy process. The next step 804 is to move all other processes assigned to the processor to the process queue 120 of that processor. In one embodiment of the invention the dummy process will run for a predetermined finite amount of time. In another embodiment the dummy process will run until a signal is received terminating it. In an embodiment of the invention, the next step 806 of the method 800 is to receive a signal to terminate the dummy process. In an alternative embodiment of the method 800 step 806 is not performed and the method 800 notes when the dummy process terminates through a time-out or other time-based termination. The next step 808 of the method 800 is for the processor 103 to resume the highest priority process in the process queue.

Figure 9:
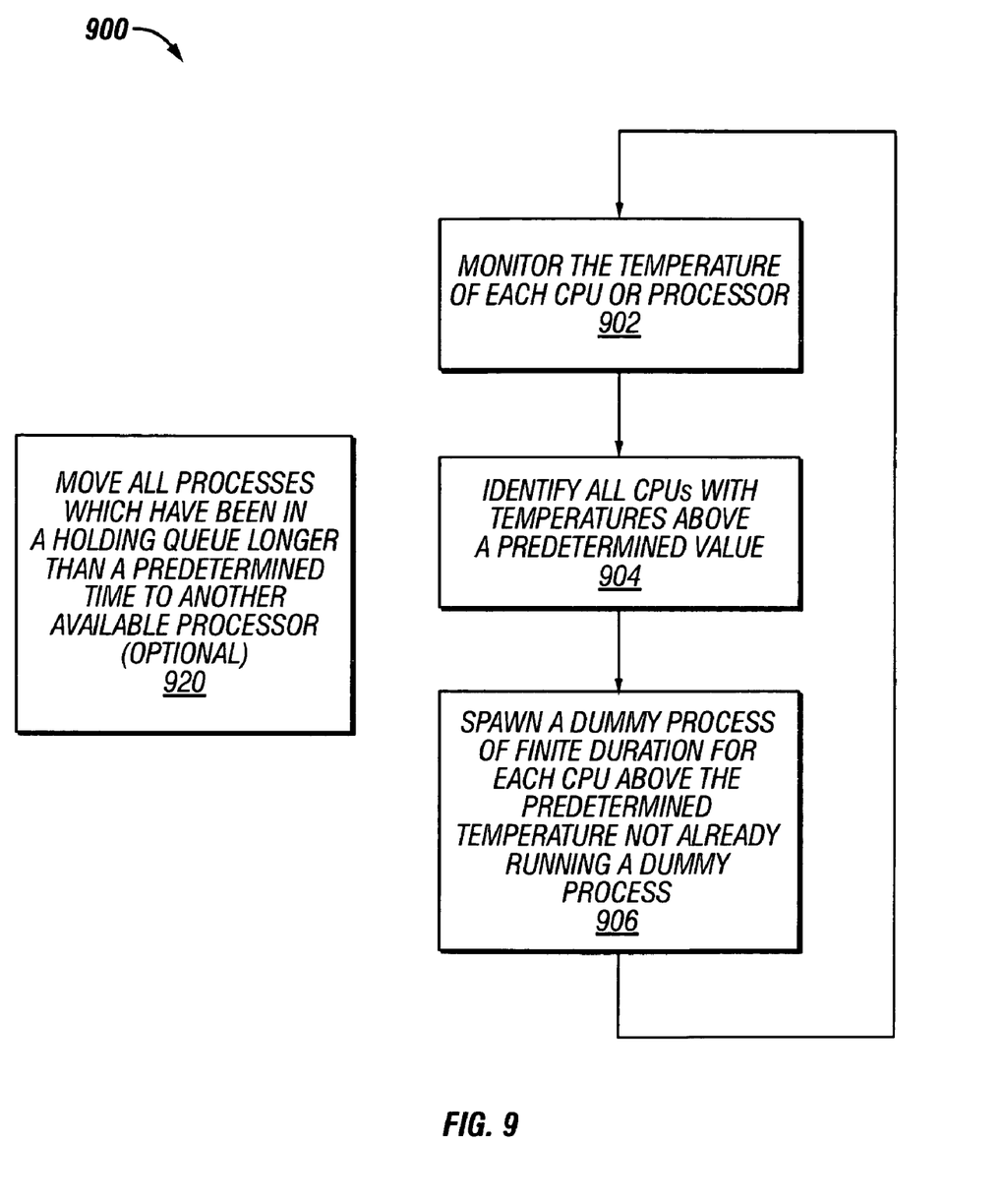
FIG. 9 is a flowchart showing an embodiment of the thermal monitoring aspect of the invention.

FIG. 9 shows a method 900 for thermal monitoring, according to an embodiment of the invention. The method 900 may be performed by the operating system 106 of the computer system 100 in one embodiment of the invention, or by an application program 108 or a combination thereof. One skilled in the art will realize that the method shown is continuous, and any step can be viewed as the commencement. However for ease of explanation it is advantageous to view step 902 as the start of the method. Step 902 is to monitor the temperature of each processor 102 or 150. This monitoring can be performed by any of the methods disclosed herein or by other methods known to one skilled in the art. The next step 904 is to identify all processors with temperatures above a predetermined value. The next step 906 is to spawn a dummy process of finite duration for each processor identified in step 904 not already running a dummy process. The optional step 920 may be performed at any point in the process and consists of moving all processes which have been in a holding queue longer than a predetermined time to another available processor.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

It is noted that, although specific embodiments have been illustrated and described herein, and are presently considered the preferred embodiments, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A computerized method comprising:
monitoring the temperature of each of a plurality of selected processors in a multi-processor computer system, wherein each of said plurality of selected processors comprises a process holding queue;
identifying any processor among said plurality of selected processors having a temperature above a predetermined upper value, spawning a dummy process requiring minimal workload, assigning said dummy process to said any processor, and assigning all processes already running on said any processor other than said dummy process to the process holding queue associated with said any processor;
moving processes that have been in a process holding queue of said any processor among said plurality of selected processors for longer than a predetermined time to another available processor among said plurality of selected processors if the temperature of said any processor remains above said predetermined upper value; and
identifying any processor among said plurality of selected processors having a temperature below a predetermined lower value and upon which a dummy process is running, and terminating said dummy process.

2. The method of claim 1, wherein said monitoring step comprises:
repetitively polling temperature sensors associated with each of said plurality of selected processors;
determining all processors among said plurality of selected processors with temperatures above said predetermined upper value or below said predetermined lower value; and
waiting for a predetermined time period.

3. The method of claim 1, wherein said monitoring step comprises:
issuing a signal via a temperature sensor when the temperature of one of said plurality of selected processors increases above said predetermined upper value;
receiving said signal; and
determining which processor is associated with said temperature sensor.

4. The method of claim 1, wherein all processors in said multi-processor computer system are among said plurality of selected processors, and wherein a dummy process is assigned a priority higher than any other process except for processes relating to said monitoring step.

5. The method of claim 1, wherein at least one processor in said multi-processor computer system is not among said plurality of selected processors, and wherein processes relating to said monitoring step are run on said at least one processor.

6. The method of claim 1, wherein said monitoring step comprises:
issuing a signal via a temperature sensor when the temperature of one of said plurality of selected processors decreases below said predetermined lower value;
receiving said signal; and
determining which processor is associated with said temperature sensor.

7. A computerized method comprising:
monitoring the temperature of each of a plurality of selected processors in a multi-processor computer system, wherein each of said plurality of selected processors comprises a process holding queue;
identifying any processor among said plurality of selected processors having a temperature above a predetermined upper value, spawning a dummy process of finite duration that requires minimal workload, assigning said dummy process to said any processor, and assigning all processes already running on said any processor other than said dummy process to the process holding queue associated with said any processor;
moving processes that have been in a process holding queue of said any processor among said plurality of selected processors for longer than a predetermined time to another available processor among said plurality of selected processors if the temperature of said any processor remains above said predetermined upper value; and
identifying any processor among said plurality of selected processors having a temperature below a predetermined lower value and upon which a dummy process is running, and terminating said dummy process.

8. A storage device comprising computer readable code for programming a computer to perform a method comprising:
monitoring the temperature of each of a plurality of selected processors in a multi-processor computer system, wherein each of said plurality of selected processors comprises a process holding queue;
identifying any processor among said plurality of selected processors having a temperature above a predetermined upper value, spawning a dummy process requiring minimal workload, assigning said dummy process to said any processor, and assigning all processes already running on said any processor other than said dummy process to the process holding queue associated with said any processor;
moving processes that have been in a process holding queue of said any processor among said plurality of selected processors for longer than a predetermined time to another available processor among said plurality of selected processors if the temperature of said any processor remains above said predetermined upper value; and
identifying any processor having a temperature below a predetermined lower value and upon which a dummy process is running, and terminating said dummy process.

9. The storage device of claim 8, wherein said monitoring step of said method comprises:
repetitively polling temperature sensors associated with each of said plurality of selected processors;
determining all processors among said plurality of selected processors with temperatures above said predetermined upper value or below said predetermined lower value; and
waiting for a predetermined time period.

10. The storage device of claim 8, wherein said monitoring step of said method comprises:
issuing a signal via a temperature sensor when the temperature of one of said plurality of selected processors increases above said predetermined upper value;
receiving said signal; and determining which processor among said plurality of selected processors is associated with said temperature sensor.

11. The storage device of claim 8, wherein all processors in said multi-processor computer system are among said plurality of selected processors, and wherein a dummy process is assigned a priority higher than any other process except for processes relating to said monitoring step of said method.

12. The storage device of claim 8, wherein at least one processor in said multi-processor computer system is not among said plurality of selected processors, and wherein processes relating to said monitoring step of said method are run on said at least one processor.

13. The storage device of claim 8, wherein said monitoring step of said method comprises:
    issuing a signal via a temperature sensor when the temperature of one of said plurality of selected processors decreases below said predetermined lower value;
    receiving said signal; and
    determining which processor among said plurality of selected processors is associated with said temperature sensor.

14. A storage device comprising computer readable code for programming a computer to perform a method comprising:
    monitoring the temperature of each of a plurality of selected processors in a multi-processor computer system, wherein each of said plurality of selected processors comprises a process holding queue;
    identifying any processor among said plurality of selected processors having a temperature above a predetermined upper value, spawning a dummy process of finite duration that requires minimal workload, assigning said dummy process to said any processor, and assigning all processes already running on said any processor other than said dummy process to the process holding queue associated with said any processor;
    moving processes that have been in a process holding queue of said any processor among said plurality of selected processors for longer than a predetermined time to another available processor among said plurality of selected processors if the temperature of said any processor remains above said predetermined upper value; and
    identifying any processor among said plurality of selected processors having a temperature below a predetermined lower value and upon which a dummy process is running, and terminating said dummy process.

15. A computing system comprising:
    a plurality of monitored processors, wherein each processor comprises a central processing unit, a temperature sensor for measuring the temperature of said central processing unit, and a process holding queue for holding processes assigned to said processor when the temperature of said processor has exceeded a predetermined upper value;
    a thermal monitor for monitoring each of said temperature sensors of said plurality of monitored processors, for assigning a dummy process requiring minimal workload to any processor for which the temperature has exceeded said predetermined upper value, and for terminating said dummy process when the temperature of said any processor drops below a predetermined lower value;
    a process scheduler for moving processes that have been in a process holding queue of any processor among said plurality of monitored processors for longer than a redetermined time to another available processor among said plurality of monitored processors if the temperature of said any processor remains above said predetermined upper value;
    a bus for transmitting signals among said thermal monitor and said plurality of monitored processors.

16. The computing system of claim 15, wherein each of said temperature sensors of said plurality of monitored processors is a passive device having electrical characteristics that change in relation to the ambient temperature in close proximity thereto.

17. The computing system of claim 15, wherein each of said temperature sensors of said plurality of monitored processors is an active device that generates an interrupt when the ambient temperature in close proximity thereto exceeds said predetermined upper value or drops below said predetermined lower value.

18. The computing system of claim 15, wherein said thermal monitor is an active device that repetitively polls each of said temperature sensors of said plurality of monitored processors.

19. The computing system of claim 15, wherein said thermal monitor is a passive device that receives interrupts generated by one or more of said temperature sensors of said plurality of monitored processors.

20. The computing system of claim 15, wherein said dummy process is assigned a priority higher than any other process allowed by said computing system.

21. The computing system of claim 15, further comprising at least one processor that is not among said plurality of monitored processors.

22. The computing system of claim 21, wherein processes of said thermal monitor and said process scheduler are run on said at least one processor.

23. The computing system of claim 15, wherein said dummy process is assigned a priority higher than all other processes except for processes spawned by said thermal monitor, and wherein all processors of said computing system are among said plurality of monitored processors.

24. The computing system of claim 15, further comprising at least one processor that is not among said plurality of monitored processors, wherein processes of said thermal monitor are run on said at least one processor.

* * * * *